(12) United States Patent
Hornung et al.

(10) Patent No.: US 6,381,657 B2
(45) Date of Patent: *Apr. 30, 2002

(54) SHARING LIST FOR MULTI-NODE DMA WRITE OPERATIONS

(75) Inventors: Bryan Hornung, Plano; Bryan Marietta, Austin, both of TX (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,077

(22) Filed: Jan. 31, 1997

(51) Int. Cl.[7] ............................................. G06F 13/28
(52) U.S. Cl. ........................................... 710/24; 710/22
(58) Field of Search ............................... 711/152, 145, 711/141, 118, 146, 144, 117, 147; 395/312, 800, 842; 364/134; 710/23, 24, 22

(56) References Cited

U.S. PATENT DOCUMENTS

| | | | | |
|---|---|---|---|---|
| 4,975,833 A | * | 12/1990 | Jinzaki | 711/152 |
| 5,251,303 A | * | 10/1993 | Fogg, Jr. et al. | 710/24 |
| 5,297,269 A | * | 3/1994 | Donaldson et al. | 711/145 |
| 5,434,976 A | * | 7/1995 | Tan et al. | 709/234 |
| 5,446,915 A | * | 8/1995 | Pierce | 712/11 |
| 5,522,045 A | * | 5/1996 | Sandberg | 709/215 |
| 5,535,116 A | * | 7/1996 | Gupta et al. | 364/134 |
| 5,560,027 A | * | 9/1996 | Watson et al. | 395/800 |
| 5,577,204 A | * | 11/1996 | Brewer et al. | 395/312 |
| 5,598,568 A | * | 1/1997 | Frisch | 712/29 |
| 5,717,897 A | * | 2/1998 | McCrory | 707/8 |
| 5,742,830 A | | 4/1998 | Elko et al. | 710/240 |
| 5,802,578 A | * | 9/1998 | Lovett | 711/147 |
| 5,845,310 A | | 12/1998 | Brooks | 711/3 |
| 5,875,352 A | * | 2/1999 | Gentry et al. | 710/23 |
| 5,887,135 A | | 3/1999 | Dahlen et al. | 709/250 |
| 5,900,020 A | | 5/1999 | Safranek et al. | 711/167 |
| 5,940,600 A | * | 8/1999 | Staats et al. | 710/107 |
| 6,002,757 A | | 12/1999 | Williams et al. | 379/207 |
| 6,041,376 A | | 3/2000 | Gilbert et al. | 710/108 |
| 6,097,801 A | | 8/2000 | Williams et al. | 379/207 |

* cited by examiner

*Primary Examiner*—B. James Peikari

(57) ABSTRACT

In a SCI based multi-node system, the write purge command joins the new node that is requesting to write to the memory of the sharing list, while maintaining the connection between the memory and the sharing list. The new node then issues the purging command to each node in the sharing list, while still maintaining the connection of the sharing list to the memory. Next, the new node issues the collapsing command to separate the sharing list from the memory after the purging command has been issued to each node. A send request data packet is used to distribute the write purge command to the memory node.

33 Claims, 14 Drawing Sheets

① MWRITE_PU ATTACH_TO_LIST NODE 3 TO MEMORY

② CPURGE FRESH_TO_INVALID NODE 3 TO NODE 0
③ CPURGE VALID_TO_INVALID NODE 3 TO NODE 1
④ CPURGE VALID_TO_INVALID NODE 3 TO NODE 2
⑤ MUPDATE LIST_TO_HOME NODE 3 TO MEMORY

FIG. 1A
(PRIOR ART)

① MWRITE FRESH_TO_HOME NODE 2 TO MEMORY

FIG. 1B
(PRIOR ART)

② CREADOO FRESH_TO_INVALID NODE 3 TO NODE 0
③ CREADOO VALID_TO_INVALID NODE 3 TO NODE 1
④ CREADOO VALID_TO_INVALID NODE 3 TO NODE 2

① MWRITE_PU ATTACH_TO_LIST NODE 3 TO MEMORY

*FIG. 2B*

② CPURGE FRESH_TO_INVALID NODE 3 TO NODE 0
③ CPURGE VALID_TO_INVALID NODE 3 TO NODE 1
④ CPURGE VALID_TO_INVALID NODE 3 TO NODE 2
⑤ MUPDATE LIST_TO_HOME NODE 3 TO MEMORY

```
// wr_purge eri_table initialization state machine
// turn the current stable state into first transitory
// state
switch (cstate) }
case ERI_CS_INVALID:
        eri_write(CS_PENDING,NULL,NULL) ;
        break;
case CS_ONLY_FRESH:
        eri_write(CS_OF_MODS_OD,NULL,NULL) ;
        break;
case CS_ONLY_DIRTY:
        eri_write(CS_OD_RETN_IN,NULL,NULL) ;
        break;
case CS_HEAD_FRESH:
        eri_write(CS_HF_MODS_HD,forw,NULL) ;
        break;
case CS_MID_VALID:
        eri_write(CS_MV_forw_MV,forw,back) ;
        break;
case CS_TAIL_VALID:
        eri_write(CI_TV_back_PEND,NULL,back) ;
        break;
case CS_HEAD_DIRTY:
        eri_write(CS_HD_INVAL_OD,forw,NULL) ;
        break;
default:
// should be able to handle everything else locally
        error () ;
        break;
}
```

FIG. 4

```
// wr_purge request state machine
switch (cstate) {
case CS_PENDING:
        eri_request(MWRITE_PU,mem_addr) ;
        break;
case CS_QUEUED_JUNK:
        eri_request(CREAD,forw) ;
        break;
case CS_QUEUED_FRESH:
        eri_request(CPURGE,CC_FRESH_INVALID,forw) ;
        break;
case CS_HD_INVAL_OD:
        eri_request(CPURGE,CC_VALID_INVALID,forw) ;
        break;
case CS_HX_INVAL_XX:
        eri_request(CPURGE,CC_VALID_INVALID,forw) ;
        break;
case CS_OD_RETN_IN:
        eri_request(MWRITE,mem_addr) ;
        break;
case CS_OD_spin_IN:
        eri_request (MUPDATE,MC_LIST_TO_HOME,mem_addr) ;
        break;
case CS_TV_back_IN:
case CI_TV_back_PEND:
        eri_request(CUPDATE,CC_PREV_VTAIL,back) ;
        break;
case CS_MV_back_IN:
        eri_request(CUPDATE,CC_PREV_VMID,back) ;
        break;
case CS_MV_forw_MV:
        eri_request(CUPDATE,CC_NEXT_VMID,forw) ;
        break;
case CS_OF_MODS_OD:
        eri_request(MUPDATE,MC_LIST_TO_GONE,mem_addr) ;
        break;
case CS_HF_MODS_HD:
        eri_request(MUPDATE,MC_LIST_TO_GONE,mem_addr) ;
        break;
case CS_OF_retn_IN:
case CI_OF_retn_PEND:
        eri_request(MUPDATE,MC_LIST_TO_HOME,mem_addr) ;
        break;
case CI_HF_FORW_HX:
        eri_request(CUPDATE,CC_NEXT_FHEAD,forw) ;
        break;
case CS_HX_retn_IN:
        eri_request(MUPDATE,MC_PASS_HEAD,mem_addr) ;
        break;
}
```

FIG. 5A

```
// wr_purge response state machine
// uses the previous state of the responder to determine
// the next state of our cache
switch (cstate) {
case CS_PENDING:
        if (resp_nullified)
                eri_retry() ;
        else {
                switch (resp_mstate) {
                case MS_HOME:
                        mac_pass_d(NULL,NULL,NULL,data) ;
                        free_eri_entry() ;
                        break;
                case MS_FRESH:
                        eri_write(CS_QUEUED_FRESH,resp_forw,NULL) ;
                        break;
                case MS_GONE:
                        eri_write(CS_QUEUED_JUNK,resp_forw,NULL) ;
                        break;
                default:
                        error() ;
                        break;
                }
        }
        break;
case CS_QUEUED_FRESH:
        if (resp_nullified)
                eri_retry() ;
        else {
                switch (resp_cstate) {
                case CS_ONLY_FRESH:
                case CS_OF_retn_IN:
                case CI_OF_retn_PEND:
                        eri_write(CS_OF_retn_IN,NULL,NULL) ;
                        break;
                case CS_HEAD_FRESH:
                        eri_write(CI_HX_INVAL_XX,resp_forw,NULL) ;
                        break;
                case CS_HX_retn_IN:
                        eri_write(CS_QUEUED_FRESH,resp_forw,NULL) ;
                        break;
                default:
                        error() :
                        break;
                }
        }
        break;
```

FIG. 5B

```
case Cl_HX_INVAL_XX:
        if (resp_nullified)
                eri_retry() ;
        else {
                switch (resp_cstate) {
                case CS_TAIL_VALID:
                case CS_TV_back_IN:
                case Cl_TV_back_PEND:
                case CS_ONLY_DIRTY:
                case CS_OD_spin_IN:
                        eri_write(CS_OF_retn_IN,NULL,NULL);
                        break;
                case CS_MID_VALID:
                case CS_MV_back_IN:
                case CS_MV_forw_MV:
                case CS_HEAD_DIRTY:
                case CS_HX_retn_IN:
                        eri_write(Cl_HX_INVAL_XX,resp_forw,NULL) ;
                        break;
                default:
                        error() :
                        break;
                }
        }
        break;
case CS_QUEUED_JUNK:
        if (resp_nullified)
                eri_retry() ;
        else {
                switch (resp_cstate)
                case CS_ONLY_DIRTY:
                case CS_HEAD_DIRTY:
                case CS_OD_spin_IN:
                        eri_write(CS_HD_INVAL_OD,forw,NULL) ;
                        break;
                case CS_HX_retn_IN:
                        eri_write(CS_QUEUED_JUNK,resp_forw,NULL) ;
                        break;
                default:
                        error() :
                        break;
                }
        }
        break;
case CS_HD_INVAL_OD:
        if (resp_nullified)
                eri_retry() ;
        else {
                switch (resp_cstate) {
                case CS_TAIL_VALID:
                case CS_TV_back_IN:
                case Cl_TV_back_PEND:
```

FIG. 5C

```
                // from this point on look just like a ONLY_DIRTY rollout
                            eri_write(CS_OD_RETN_IN,forw,NULL) ;
                            break;
                    case CS_MID_VALID:
                    case CS_MV_back_IN:
                    case CS_MV_forw_MV:
                            eri_write(CS_HD_INVAL_OD,resp_forw,NULL) ;
                            break;
                    default:
                            error() :
                            break;
                    }
            }
            break;
    case CS_OD_RETN_IN:
        if (resp_nullified)
                eri_write(CS_OD_spin_IN,NULL,NULL) ;
        else {
            switch (resp_mstate) {
            case MS_GONE:
                    mac_write(ERI_CS_INVALID,NULL,NULL) ;
                    free_eri_entry() ;
                    break;
            default:
                    error() :
                    break;
            }
        }
        break;
    case CS_OD_spin_IN:
        if (resp_nullified)
                eri_retry() ;
        else {
            switch (resp_mstate) {
            case MS_GONE:
                    eri_write(CS_OD_RETN_IN,NULL,NULL) ;
                    break;
            default:
                    error() :
                    break;
            }
        }
        break;
    case CS_OF_MODS_OD:
        if (resp_nullified)
                eri_write(CS_OF_retn_PEND,NULL,NULL) ;
        else {
            switch (resp_mstate) {
            case MS_FRESH:
```

FIG. 5D

```
// from this point on look just like a ONLY_DIRTY rollout
                    eri_write(CS_OD_RETN_IN,forw,NULL) ;
                    break;
                default:
                    error() :
                    break;
                }
            }
            break;
        caseCl_OF_retn_PEND:
            if (resp_nullified)
                eri_retry() ;
            else {
                switch (resp_mstate) {
                case MS_FRESH:
                    eri_write(Cl_PENDING,NULL,NULL) ;
                    break;
                default:
                    error() :
                    break;
                }
            }
            break;
        case Cl_TV_back_PEND:
            if (resp_nullified)
                eri_retry() ;
            else {
                switch (resp_cstate) {
                case CS_HEAD_DIRTY:
                case CS_HEAD_FRESH:
                case CS_MID_VALID:
                case CS_MV_forw_MV:
                case Cl_HD_FORW_HX:
                case Cl_HF_FORW_HX:
                case CS_HF_MODS_HD:
                case CS_HD_INVAL_OD:
                case Cl_HX_INVAL_XX:
                case Cl_HD_UPDATE_HD:
                    eri_write(CS_PENDING,NULL,NULL) ;
                    break;
                default:
                    error() ;
                    break;
                }
            }
            break;
        case Cl_TO_PENDING:
            eri_write(CS_PENDING,NULL,NULL) ;
            break;
```

FIG. 5E

```
case CS_HF_MODS_HD:
    if (resp_nullified)
        eri_write(Cl_HF_FORW_HX,forw,NULL) ;
    else {
        switch (resp_mstate) {
        case MS_FRESH:
            eri_write(CS_HD_INVAL_OD,forw,NULL) ;
            break;
        default:
            error() :
            break;
        }
    }
    break;
case Cl_HF_FORW_HX:
    if (resp_nullified)
        eri_retry() ;
    else {
        switch (resp_cstate) {
        case CS_MID_VALID:
        case CS_TAIL_VALID:
            eri_write(CS_HX_retn_IN,NULL,NULL) ;
            break;
        default:
            error() ;
            break;
        }
    }
    break;
case Cl_HF_FORW_OF:
    eri_write(Cl_OF_retn_PEND,NULL,NULL) ;
    break;
case CS_HX_retn_IN:
    if (resp_nullified)
        eri_retry() ;
    else {
        switch (resp_mstate) {
        case MS_FRESH:
        case MS_GONE:
            eri_write(CS_PENDING,NULL,NULL) ;
            break;
        default:
            error() :
            break;
        }
    }
    break;
case CS_MV_back_IN:
    if (resp_nullified)
        eri_retry() ;
```

```
      else {
            switch (resp_cstate) {
            case CS_HEAD_DIRTY:
            case CS_HEAD_FRESH:           FIG. 5F
            case CS_MID_VALID:
            case CS_MV_forw_MV:
            case CI_HD_FORW_HX:
            case CI_HF_FORW_HX:
            case CS_HF_MODS_HD:
            case CS_HD_INVAL_OD:
            case CI_HX_INVAL_XX:
            case CI_HD_UPDATE_HD:
                  eri_write(CS_PENDING,NULL,NULL) ;
                  break;
            default:
                  error() ;
                  break;
            }
      }
      break;
case CS_MV_forw_MV:
      if (resp_nullified)
            eri_retry() ;
      else {
            switch (resp_cstate) {
            case CS_MID_VALID:
            case CS_TAIL_VALID:
                  eri_write(CS_MV_back_IN,NULL,back) ;
                  break;
            default:
                  error() ;
                  break;
            }
      }
      break;
case CS_TV_back_IN:
      if (resp_nullified)
            eri_retry() ;
      else {
            switch (resp_cstate) {
            case CS_HEAD_DIRTY:
            case CS_HEAD_FRESH:
            case CS_MID_VALID:
            case CS_MV_forw_MV:
            case CI_HD_FORW_HX:
            case CI_HF_FORW_HX:
            case CS_HF_MODS_HD:
            case CS_HD_INVAL_OD:
            case CI_HX_INVAL_XX:
            case CI_HD_UPDATE_HD:
                  mac_write(ERI_CS_INVALID,NULL,NULL) ;
                  free_eri_entry;
                  break;
```

FIG. 6A

```
// wr_purge conflicting request state machine
// use the current state of the cache line in the table and the incoming
// request to determine the new cache state. Nullify anything not listed
// in the statement below.

switch (cstate)
case CS_MV_back_IN:
        switch (req_in)
        case CPURGE:
                eri_write(CS_TO_INVALID, forw, back) ;
                break;
        case CINC:
                // no state change, but don't nullify
                break;
        break;
case CS_MV_forw_MV:
        switch (req_in)
        case CPURGE:
                eri_write(CS_TO_PENDING, forw, back) ;
                break;
        case CUPDATE, PREV_VMID:
                // no state change, but change forw ptr to passed ptr
                eri_write(cstate, req_ptr, back) ;
                break;
        case CUPDATE, PREV_VTAIL:
                eri_write(CI_TO_TV_back_PEND, forw, back_)
                break;
        break;
case CS_OD_spin_IN:
        switch (req_in)
        case CUPDATE, PEND_VALID:
        case CREAD:
                eri_write(CS_TO_TV_back_IN, forw, back) ;
                break;
        case CPURGE, VALID_INVALID:
                eri_write(CS_TO_INVALID, forw, back) ;
                break;
break;
```

FIG. 6B

```
case CS_HF_MODS_HD:
    switch (req_in)
        case CUPDATE, PREV_VMID:
            // no state change, but change forw ptr to passed ptr
            eri_write(cstate, req_ptr, back) ;
            break;
        case CUPDATE, PREV_VTAIL:
            eri_write(CS_OF_MODS_OD, forw, back) ;
            break;
    break;
case CS_OF_retn_IN:
    switch (req_in)
        case CUPDATE, PEND_VALID:
        case CREAD:
            eri_write(CS_TO_TV_back_IN, forw, back) ;
            break;
        case CPURGE, FRESH_INVALID:
            eri_write(CS_TO_INVALID, forw, back) ;
            break;
    break;
case CS_TV_back_IN:
    switch (req_in)
        case CPURGE, VALID_INVALID:
            eri_write(CS_TO_INVALID, forw, back) ;
            break;
    break;
case CI_HF_FORW_HX:
    switch (req_in)
        case CUPDATE, PREV_VMID:
            // no state change, but change forw ptr to passed ptr
            eri_write(cstate, req_ptr, back) ;
            break;
        case CUPDATE, PREV_VTAIL:
            eri_write(CI_HF_FORW_OF, forw, back) ;
            break;
    break;
```

FIG. 6C

```
case CI_HD_fORW_HX:
    switch (req_in)
    case CUPDATE, PREV_VMID:
            eri_write(cstate, req_ptr, back) ;
            // no state change, but change forw ptr to passed ptr
            break;
    case CUPDATE, PREV_VTAIL:
            eri_write(CI_HD_FORW_OD, forw, back) ;
            break;
        break;
case CS_HX_retn_IN:
    switch (req_in)
    case CUPDATE, PEND_VALID:
    case CREAD:
    case CPURGE, FRESH_INVALID:
    case CPURGE, VALID_INVALID:
            eri_write(CI_TO_PENDING, forw, back) ;
            break;
        break;
case CI_TV_back_PEND:
    switch (req_in)
    case CPURGE, VALID_INVALID:
            eri_write(CI_TO_PENDING, forw, back) ;
            break;
        break;
case CI_HD_UPDATE_HD:
    // no change in this state - shouldn't be reached
    break;
case CI_OF_retn_PEND:
    switch (req_in)
    case CUPDATE, PEND_VALID:
    case CREAD:
            eri_write(CI_TO_TV_back_PEND, forw, back) ;
            break;
    case CPURGE, FRESH_INVALID:
            eri_write(CI_TO_PENDING, forw, back) ;
            break:
        break;
default:
        break;
```

| flag bit | | | | | | | | | | | | | | |
|---|---|---|---|---|---|---|---|---|---|---|---|---|---|---|
| 0 | previous CRC or idle ||||||||||||||
| 1 | init | destID | sync | srcID | | TID | dl | ds | echo | busy | resp | clk | old | phase |
| | 1 | 7 | 1 | 7 | 2 | 5 | 1 | 1 | 1 | 1 | 1 | 1 | 1 | 2 |
| 1 | command | op | | p | | bytemask | | T | addr<0:3> |||||
| | 6 | 3 | 2 | 1 | 3 | 11 | | 2 | 4 |||||
| 1 | addr<4:35> ||||||||||||||
| 1 | data ||||||||||||||
| 1 | data ||||||||||||||
| 1 | data ||||||||||||||
| 1 | data ||||||||||||||
| 1 | data ||||||||||||||
| 1 | data ||||||||||||||
| 1 | data ||||||||||||||
| 1 | data ||||||||||||||
| 0 | low CRC ||||||| high CRC |||||||

401 (points to bytemask boundary)

500

FIG. 8 write_mask

| 0 | 501 start [0:4] | 502 end [0:4] | 9 |

SHARING LIST FOR MULTI-NODE DMA WRITE OPERATIONS

TECHNICAL FIELD OF THE INVENTION

This invention relates in general to memory accesses in multi-node, multi-processor, cache coherent non-uniform access system and relates in particular to a system and method for performing a write purge operation in such a system.

BACKGROUND OF THE INVENTION

The Scalable Coherent Interface (SCI) Direct Memory Access (DMA) write operations in the standard SCI specification completely over-writes the cache lines. If the DMA devices are only updating some of the bytes in the line, the information contained in the memory for the other bytes are lost in the complete overwrite.

The DMA write operation also relies on software to maintain cache coherency. If two devices are writing the same line, the second device can believe that it has finished purging all caches that contain the old data, even though the lines are being purged because of the first device. This second device can then allow other software to read stale data. The use of stale data by the software will cause program errors.

Other prior art methods for writing partial lines rely on reading the line into a local cache before the specified bytes are updated. This results in other desirable data being swapped out of the cache because of conflicts with the stored read data. In the end, this results in poor performance of other processes that are currently running because of the extra memory operations and the latency associated with refetching affected data.

Therefore, there is a need in the art for a method and system that has a write command that does not allow the use of stale data by the software.

In addition, there is a need in the art for a method and system that does not require reading memory lines into a local cache before the updating memory bytes.

SUMMARY OF THE INVENTION

These and other objects and features are achieved in a system which follows the same general flow as the DMA Write as described in the SCI specification, however, the inventive system and method does not detach the cache sharing list from memory. Instead, it joins the sharing list. This prevents another write purge from another node from believing it has finished its operation while memory lines are still encached. If no sharing list exists, a mask supplied by the command is used to merge the new data into memory. The system and method tracks down stale data in remote caches and merges it into the memory line using a mask instead of discarding it.

One technical advantage of the present invention is to issue a write purge command that joins the new node to the sharing list, while maintaining the connection between memory and the sharing list.

Another technical advantage of the present invention is to have the new node issue the purging command to each node in the sharing list, while maintaining the connection between the memory and the sharing list.

A further technical advantage of the present invention is to have the new node issue the collapsing command to separate the sharing list from the memory after the purging command has been issued to each node. The collapsing command completes the destruction of the sharing list.

A further technical advantage of the present invention is to use a write mask with the write purge command.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1A:
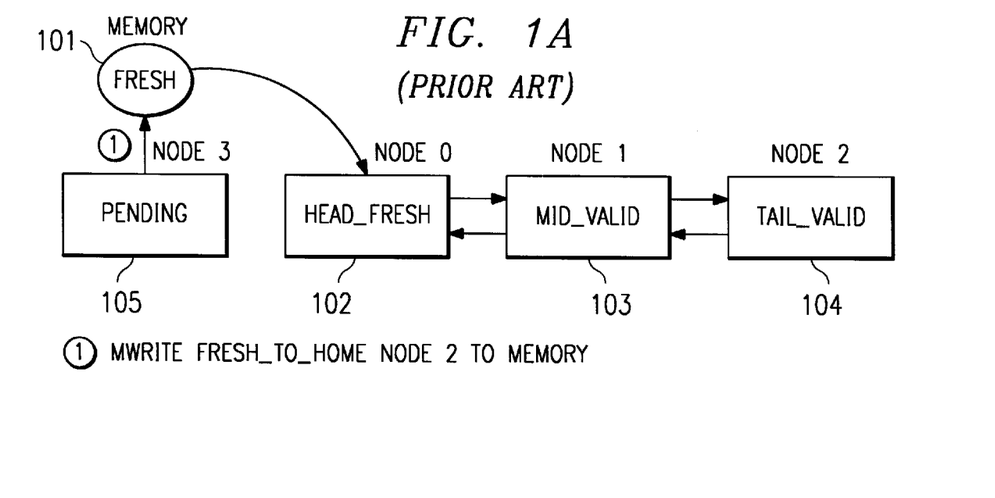
FIGS. 1A, 1B and 1C show an example of the SCI specification write purge operation.
Figure 1B:
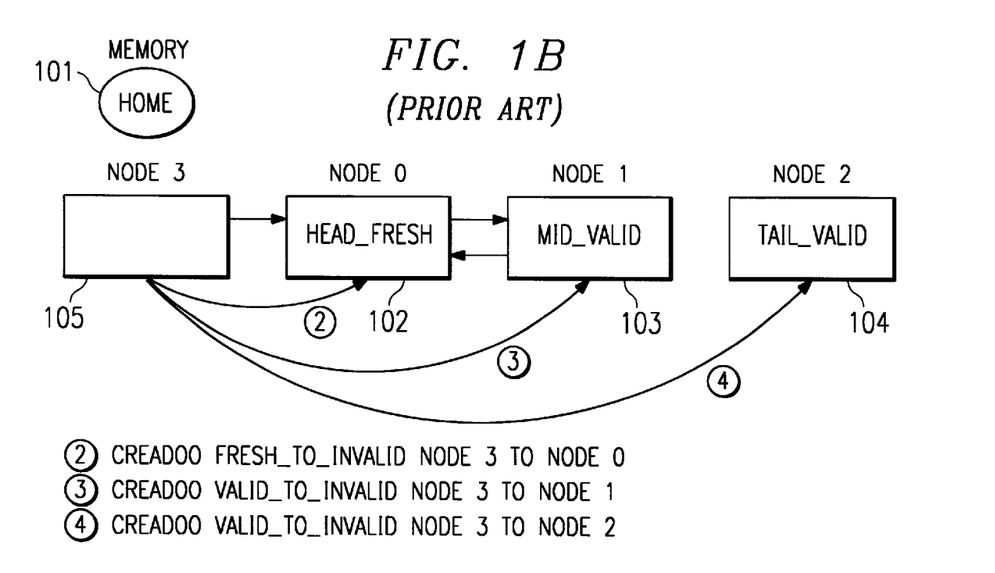
Figure 1C:
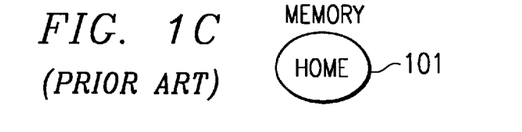

FIGS. 1A to 1C show how the prior art SCI specification performs a DMA write to a line that is fresh with a sharing list. The list starts out with memory 101 in the state of fresh with pointer to node 0 102. Node 0 102 is head_fresh and has a forward pointer to node 1 103, which is mid_valid. Node 1 103 has a back pointer back to the head, node 0 102, and a forward pointer to node 2 104. Node 2 104 is tail_valid and has a back pointer to the mid or node 1 103.

The first step that is performed by the standard SCI flow is to determine if another node wants to write this memory line, if so, then it will issue an MWRITE_FRESH_TO_HOME. As shown in FIG. 1A, node 3 105 wants to write to the memory line and issues the MWRITE command to begin the write operation. FIG. 1B shows that the list fresh_to_home is actually detached from the memory 101 so that the sharing list of nodes 0, 1, and 2 102, 103, 104 is no longer connected to the memory 101. So the memory is now marked home and any new accesses can retrieve the memory line directly from memory 101.

Now node 3 105 goes in and cleans up or purges the sharing list. Node 3 105 sends CREAD00_FRESH_TO_

INVALID from node 3 to node 0. When node 3 105 receives a response, it uses the response to get the forward pointer. Node 3 105 then uses the forward pointer to send CREAD00_VALID_TO_INVALID from node 3 105 to node 1 103. When node 3 105 receives a response, it then uses the forward pointer from the response to send the CREAD00_VALID_TO_INVALID from node 3 105 to node 2 104. When this operation is complete or done, only memory in the home state contains a copy of the data.

The SCI specification relies on software interlocking in such a way that it does not access the fresh memory until the list is totally purged. This can be very difficult if multiple write purges occur to the same memory line almost simultaneously, as the second one will immediately see that the line is marked HOME and allow software to access this line, which could still have stale copies.

Figure 2A:
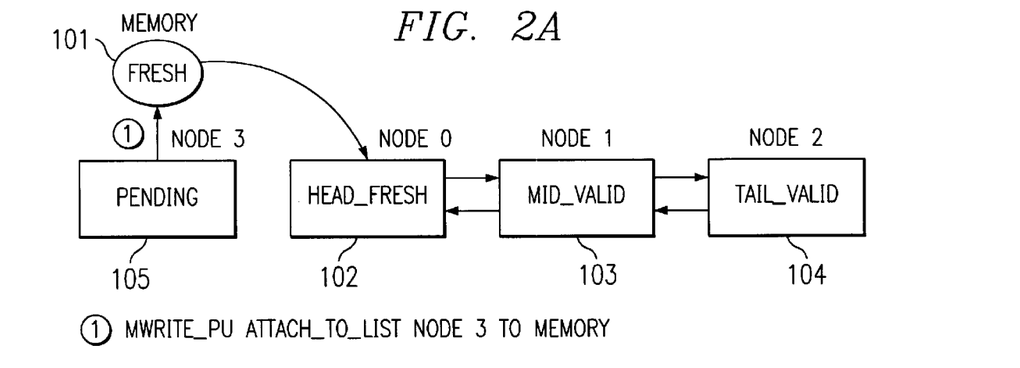
FIGS. 2A, 2B and 2C show an example of the inventive write purge partial operation.
Figure 2B:
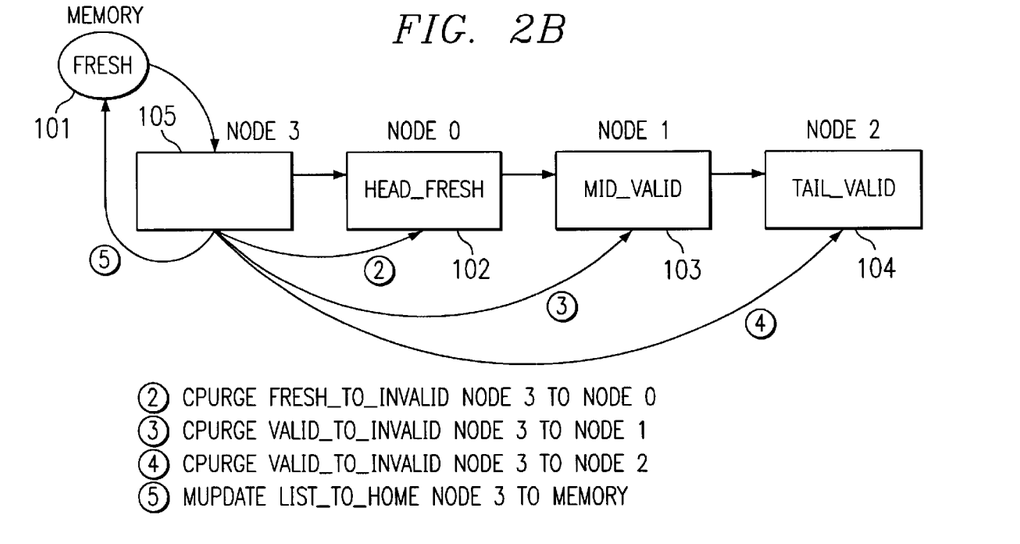

FIGS. 2A to 2C show that the operation of the invention commences similarly to that shown in FIG. 1A, beginning with the initial state with memory 101 being marked fresh and its pointer to node 0 102. Node 0 102 is marked head_fresh with a forward pointer to node 1 103 which is mid_valid. Mid_valid has a back pointer to the head and a forward pointer to node 2 104, which is tail_valid. Again, node 3 105 wants to do a write_purge or an update_memory with the new data. So node 3 105 sends an MWRITE_purge command, MWRITE_PU_ATTACH_TO_LIST, from node 3 105 to memory 101. As shown in FIG. 2B, memory 101 and node 3 105 uses the mask 500 (FIG. 8) from the write_purge_partial command to merge in the new data and does not detach the list as in FIG. 1B.

So now the list is still connected with the memory 101 marked fresh. The forward pointer of the memory 101 points to node 3 105. Node 3 105 points to node 0 102. Node 0 102 remains in the head_fresh state since it has not received any communication from node 3 105. Node 0 102 has a forward pointer pointing to node 1 103 mid_valid, and the mid_valid has a forward pointer to tail_valid node 2 104.

After node 3 105 receives its response from the mwrite_purge command, it then does a CPURGE not a CREAD, because in this case the line is FRESH and does not need new data. So after the mwrite_purge response, node 3 105 starts purging the list with a CPURGE_FRESH_TO_INVALID from node 3 105 to node 0 102. Node 3 105 then receives a response from node 0 containing the next forward pointer, and issues a CPURGE_VALID_TO_INVALID from node 3 105 to node 1 103.

Figure 2C:
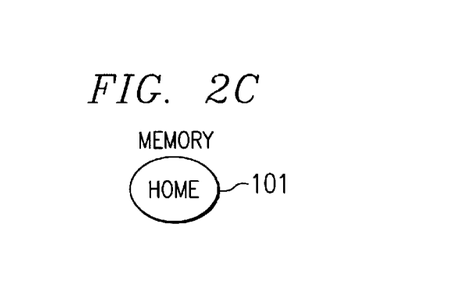

When node 3 105 receives a response from node 1 103 with the next forward pointer, it then performs a CPURGE_VALID_TO_INVALID from node 3 105 to node 2 104. When node 3 105 sees that the tail_valid node, here node 2 104, has been reached, it then does an MUPDATE_LIST_TO_HOME from node 3 105 to the memory 101 and the memory is left in the home state as shown in FIG. 2C. Thus, this method achieves the same results as shown in FIG. 1C.

FIGS. 3 to 6 describe the operations handled by the various state machines inside the SCI controller to do the write_purge_partial flow.

Figure 3:
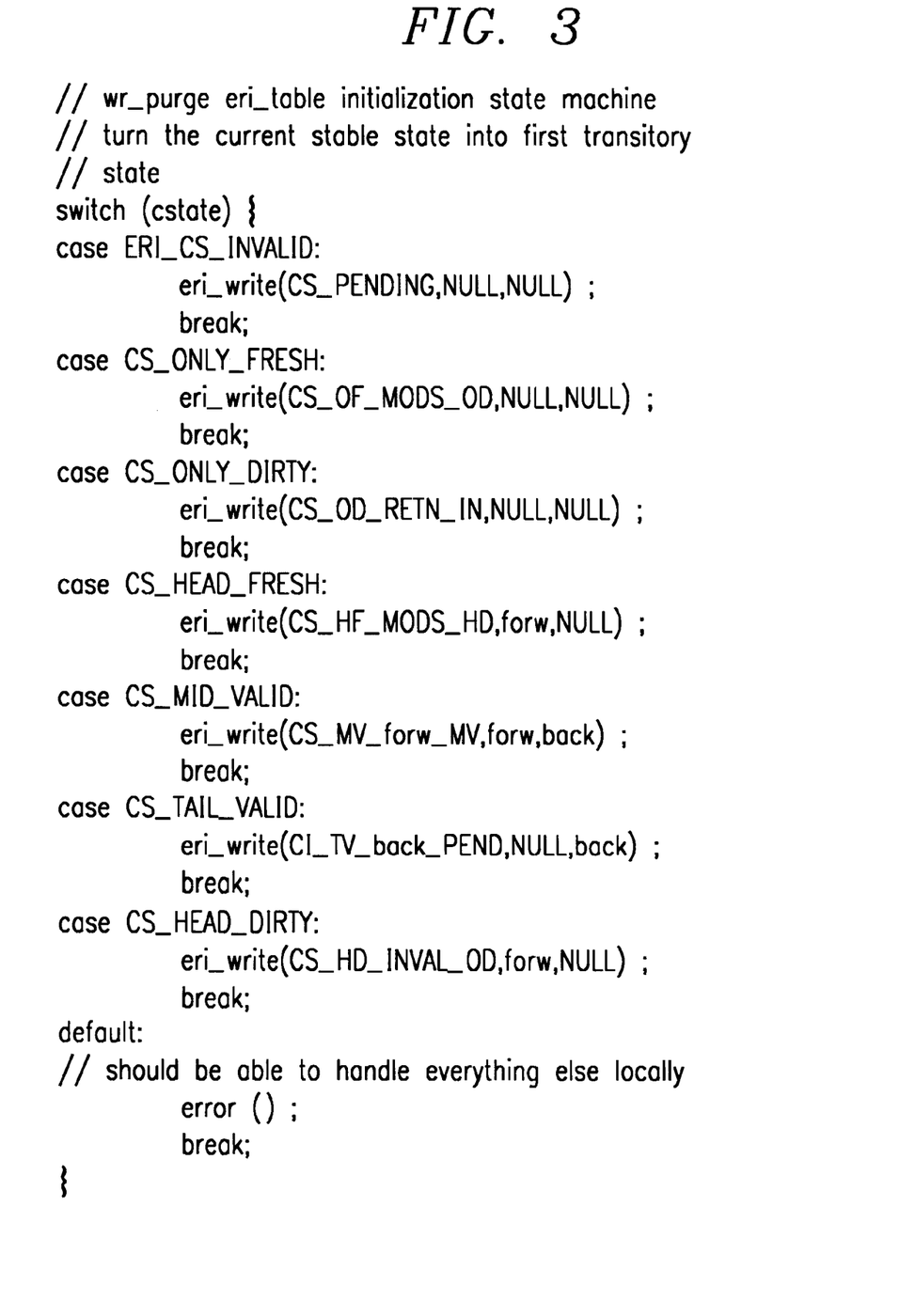
FIG. 3 describes the operations performed by an initialization state machine to execute the write purge operation.

FIG. 3 describes the operations for the memory access controller Request State Machine Logic. This state machine will take requests from the memory access controller, and given the state passed by the memory access controller and the flow, will decide on the first state that is inside the SCI controller. For example, in the write_purge case, where the memory access controller requests with head_fresh, the SCI controller would initialize this request to a CS_HF_MODS_HD state, or for in a different case, head_fresh_MODS_only_head_dirty state.

Figure 4:
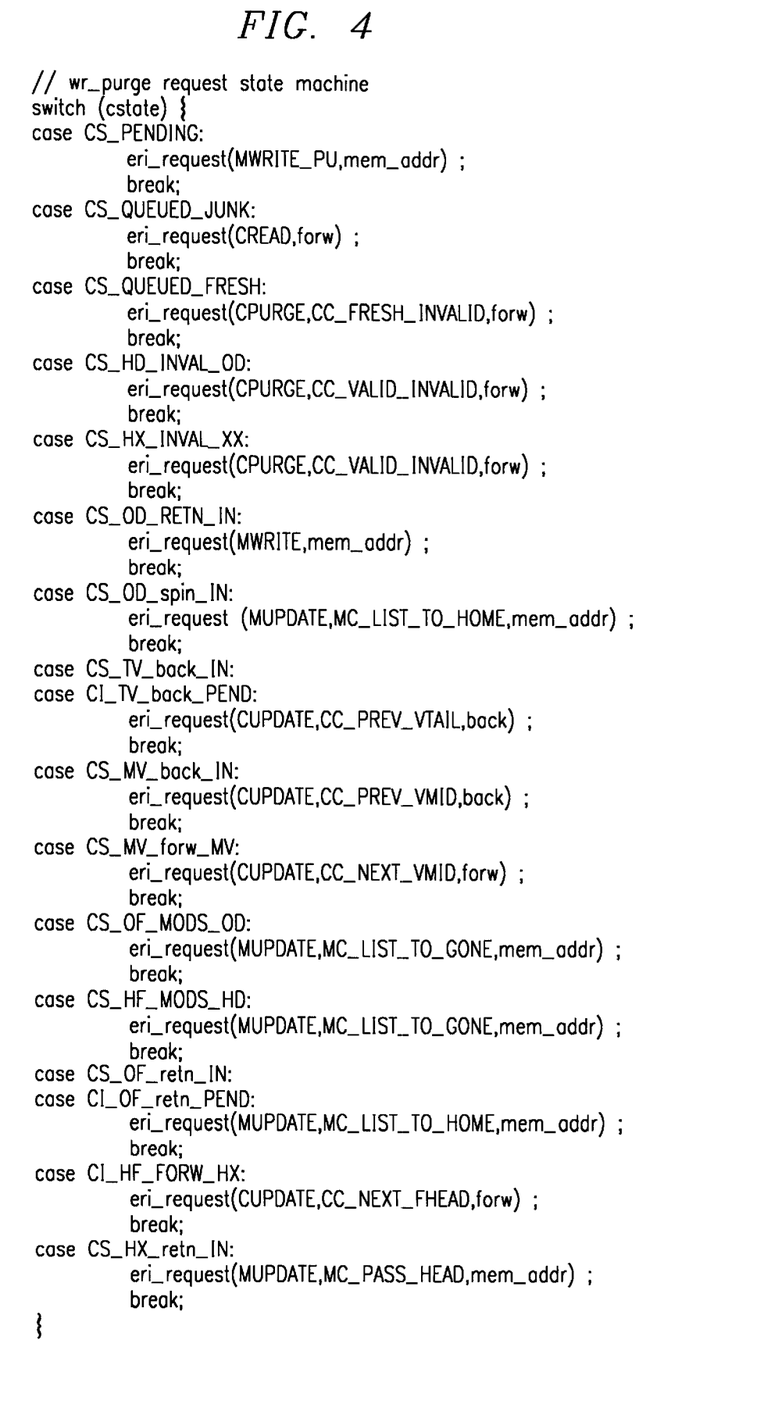
FIG. 4 describes the operations performed by a request state machine to execute the write purge operation.
Figure 5A:
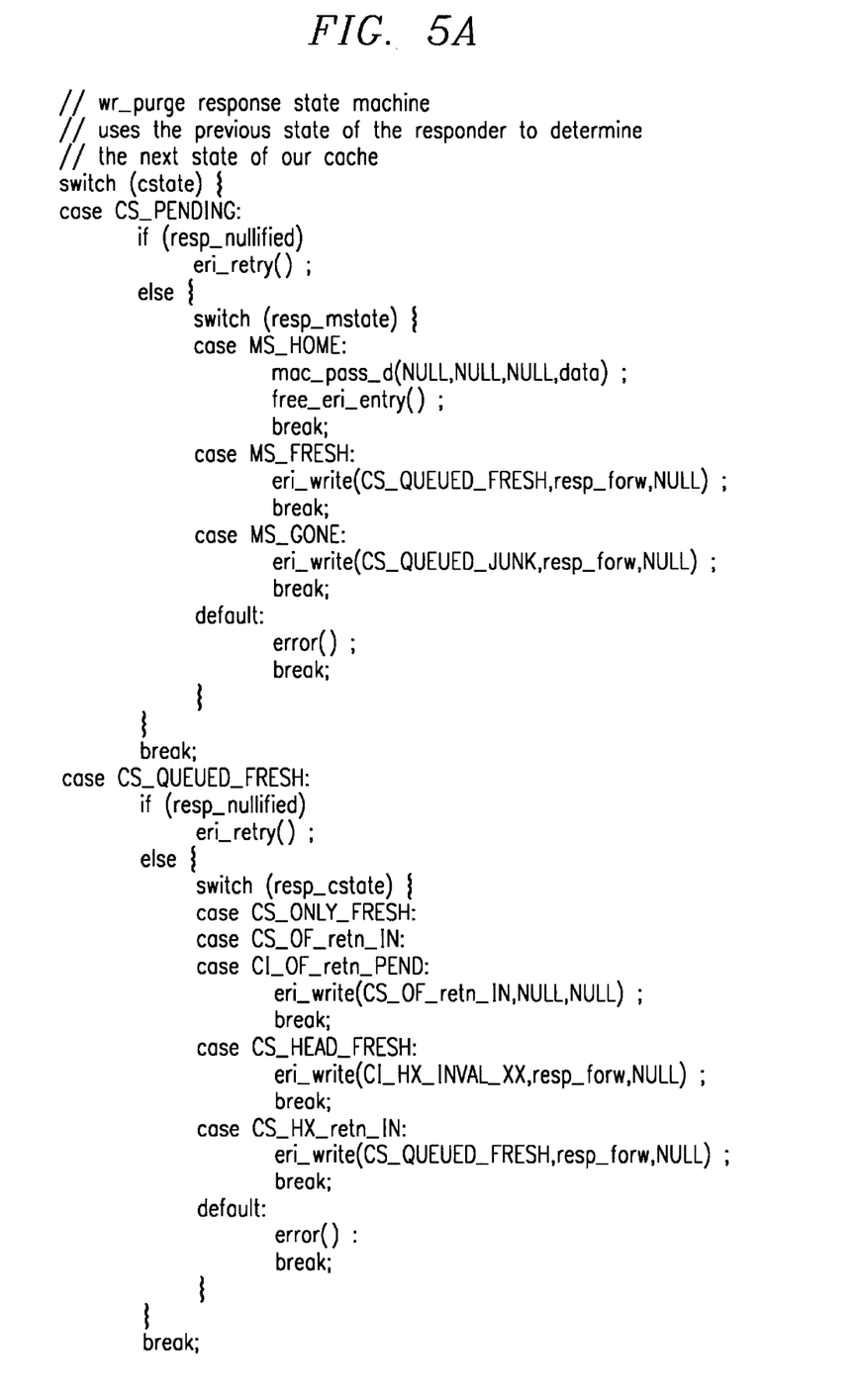
FIGS. 5A, 5B, 5C, 5D, 5E and 5F describe the operations performed by a response state machine to execute the write purge operation.
Figure 5B:
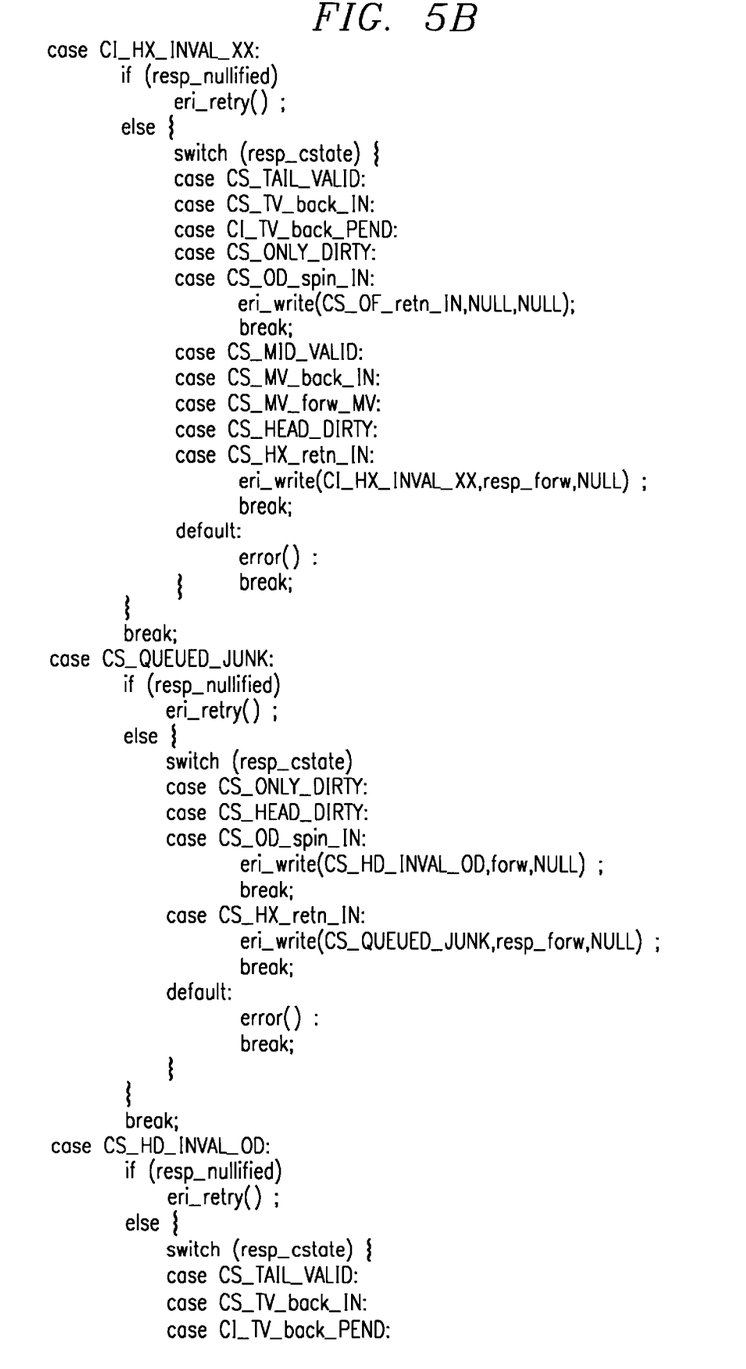
Figure 5C:
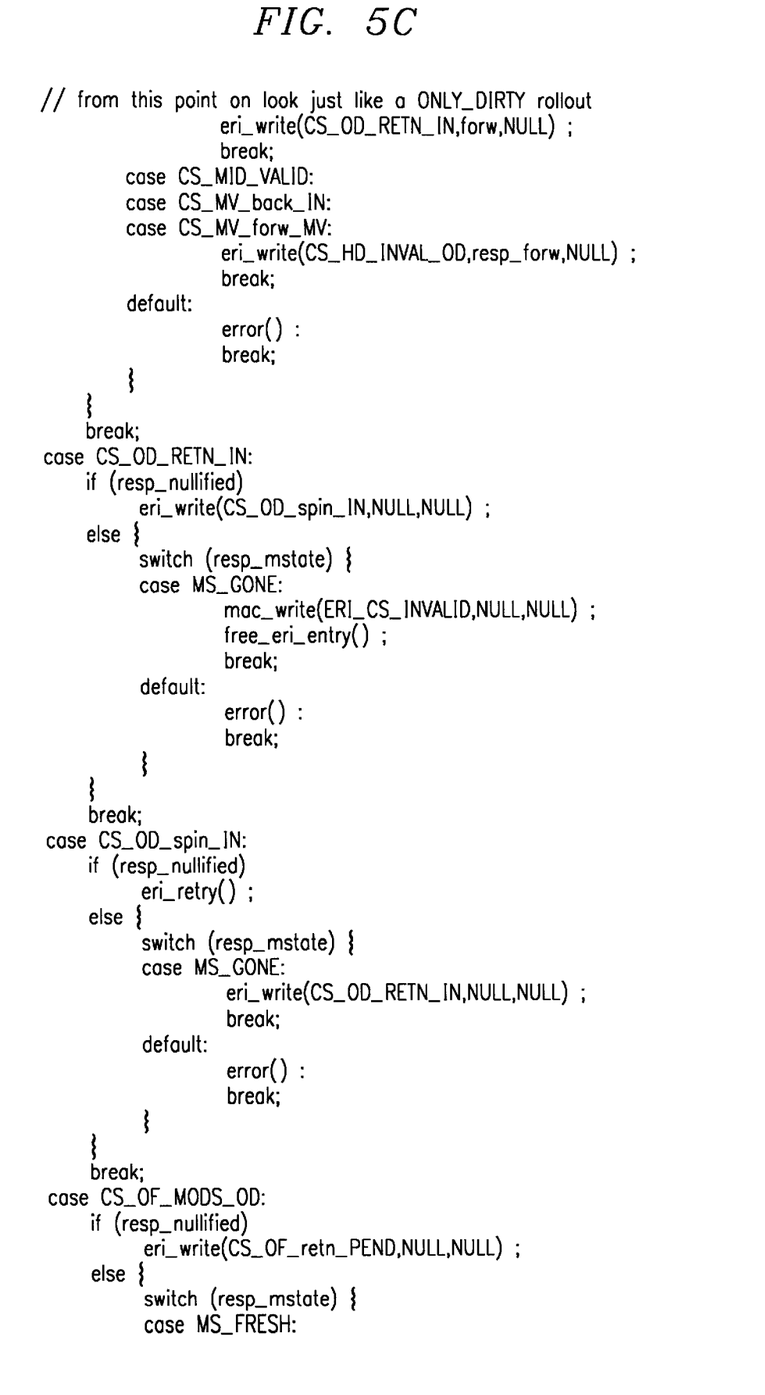
Figure 5D:
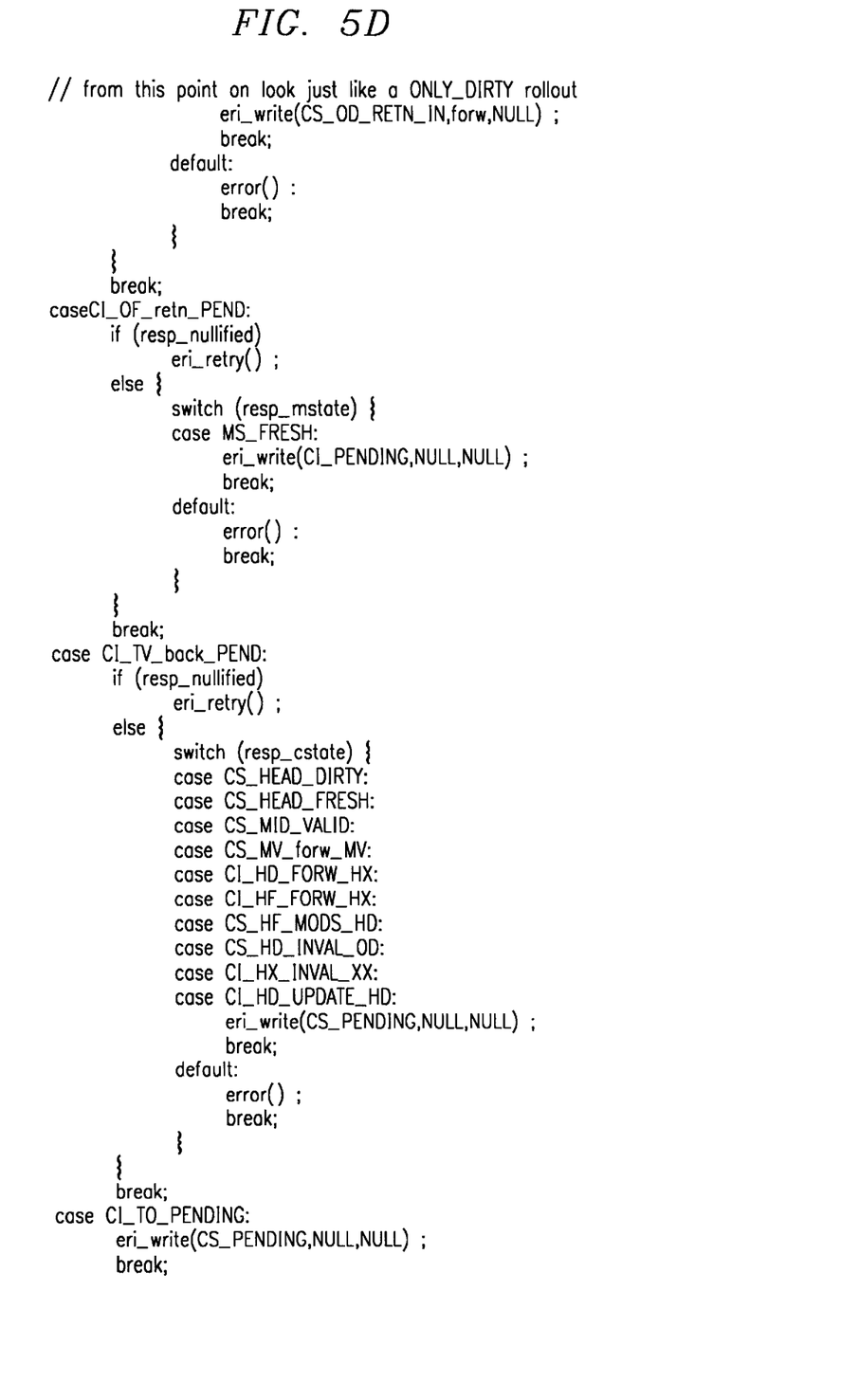
Figure 5E:
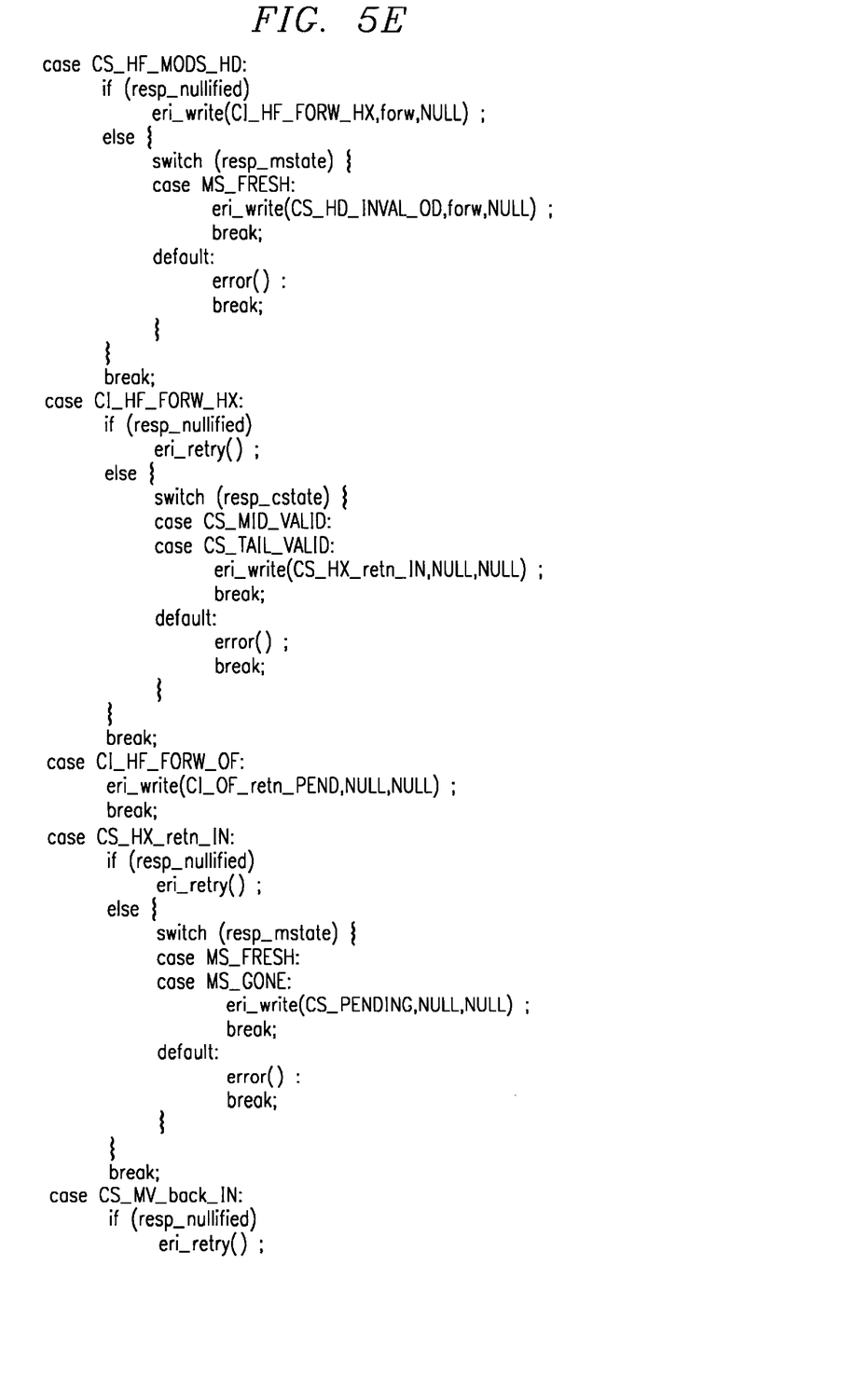
Figure 5F:
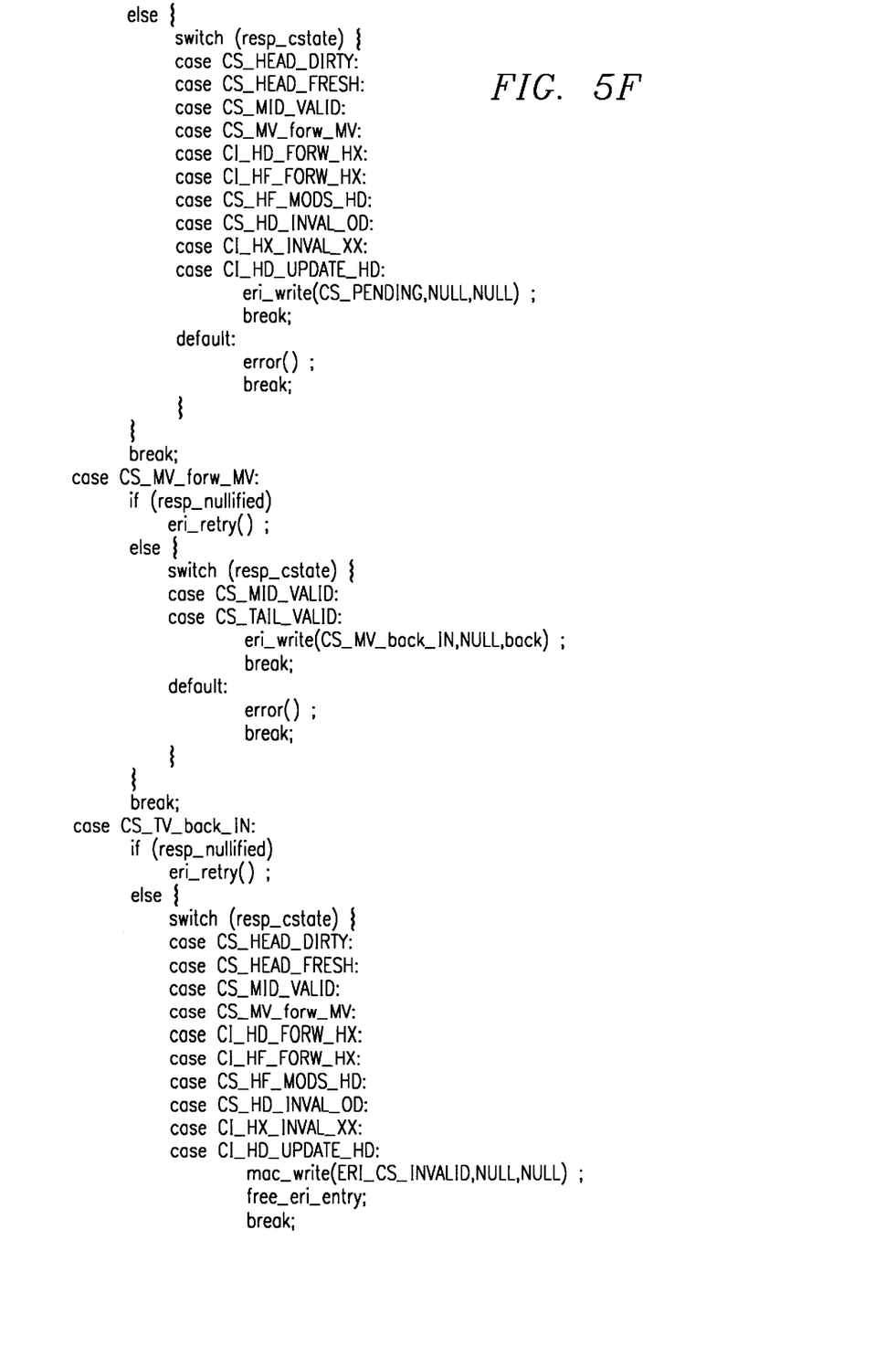

FIG. 4 describes how that state is turned into a request on the ring. In the previous case where the state is CS_HF_MODS_HD, this state machine would then make a ring request of mupdate_list_to_gone.

FIGS. 5A–F describes the operations for the Response State Machine. This state machine describes what is done when a response is received from the remote memory or cache. The machine decides whether to make another request to the ring, make a response to the memory access controller, or in some cases, perform both. Again following the previous case where CS_HF_MODS_HD, if the response is not nullified and is FRESH, in that case, then the machine will transition to the CS_HD_INVAL_OD state and then the FIG. 3B state machine will take this state and generate a new request.

Figure 6A:
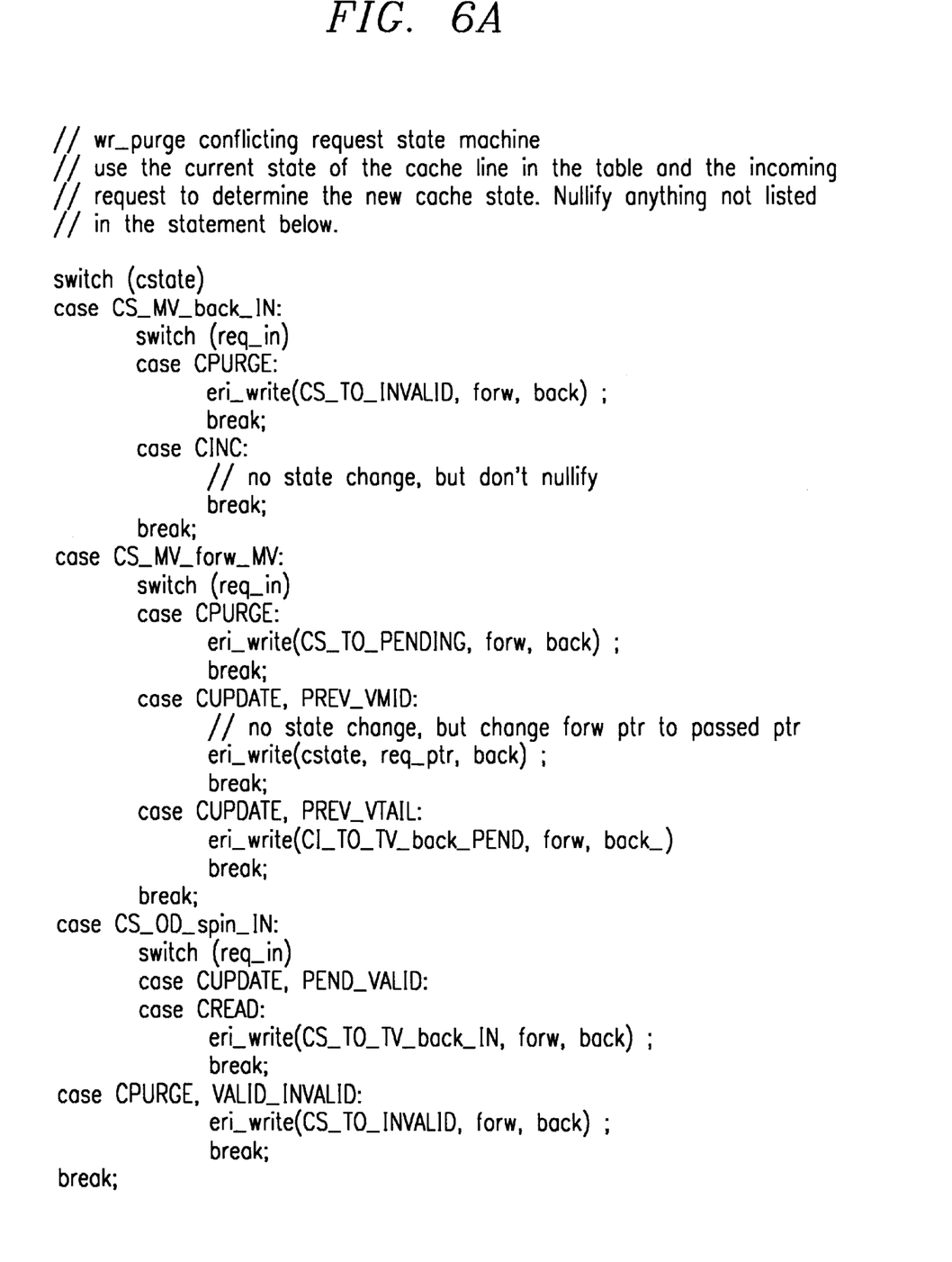
FIGS. 6A, 6B and 6C describe the operations performed by a conflicting state machine to execute the write purge operation.
Figure 6B:
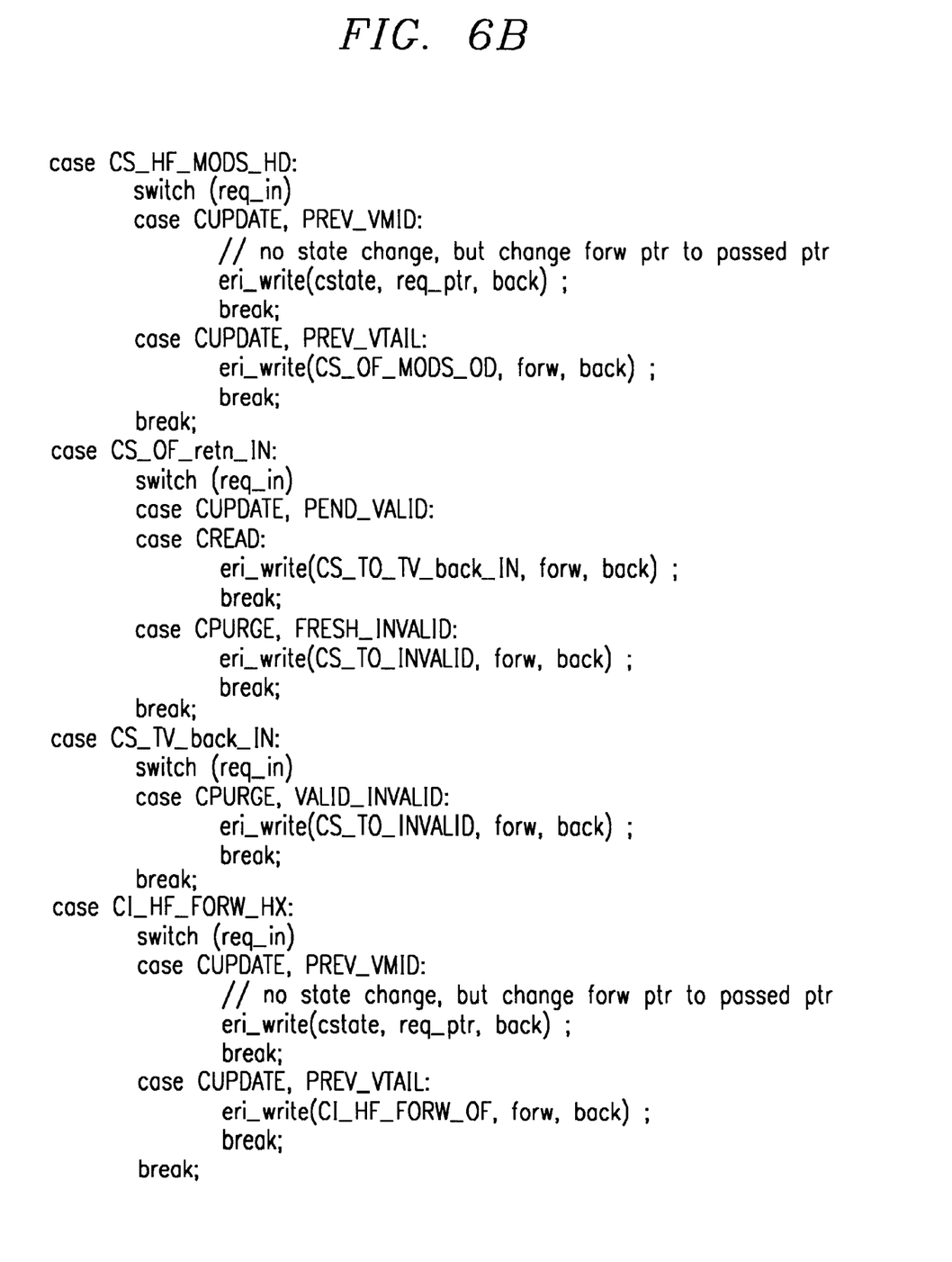
Figure 6C:
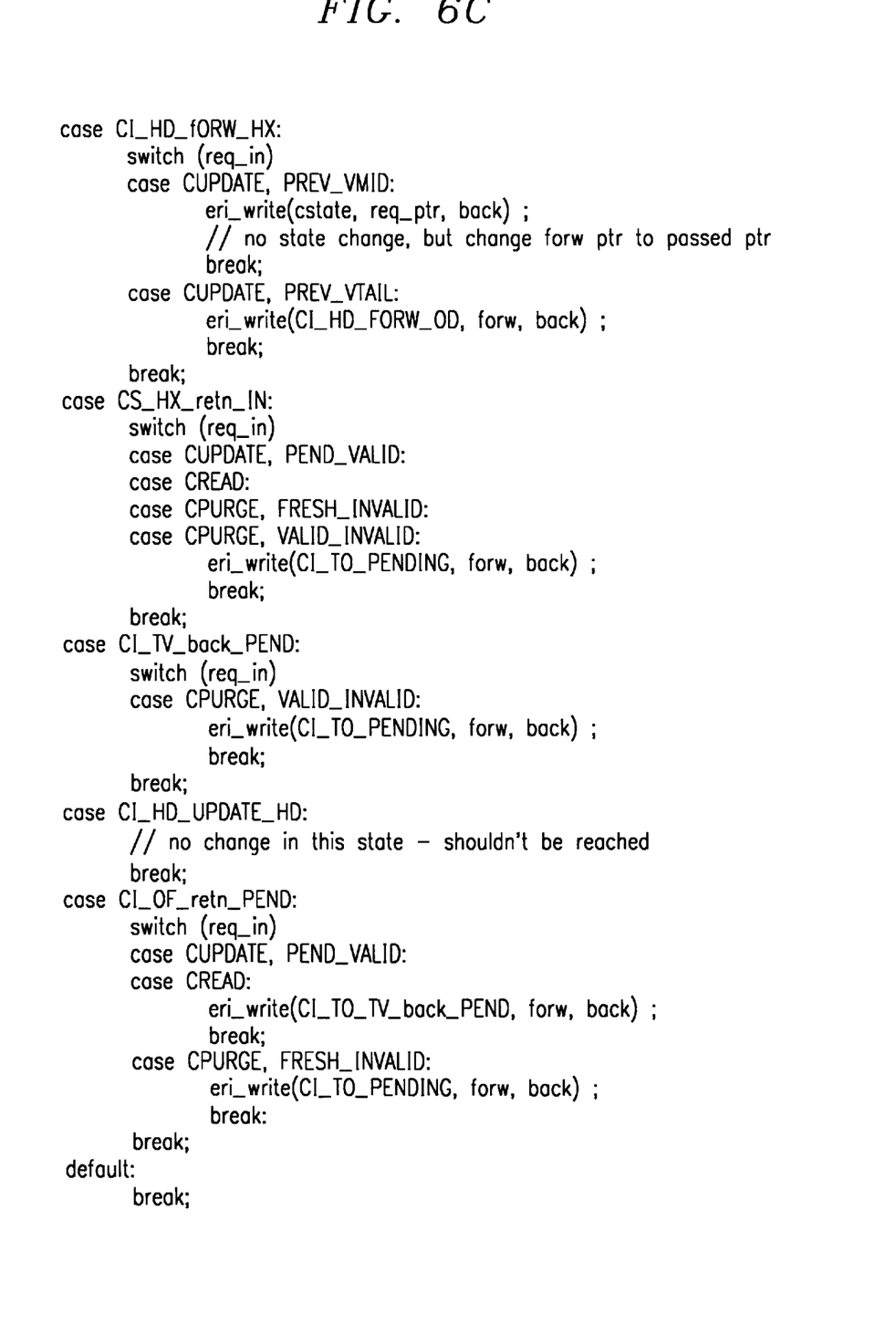

The state machine of FIGS. 6A–C describes what happens if a request for the same line is received from another node while actively in the write purge flow. Again following the previous case where CS_HF_MODS_HD state, the state machine will allow a cupdate_prevmid or cupdate_prevtail to complete. All other requests will be nullified. The prev-TAIL will update the forward pointer and change the state.

Figure 7:
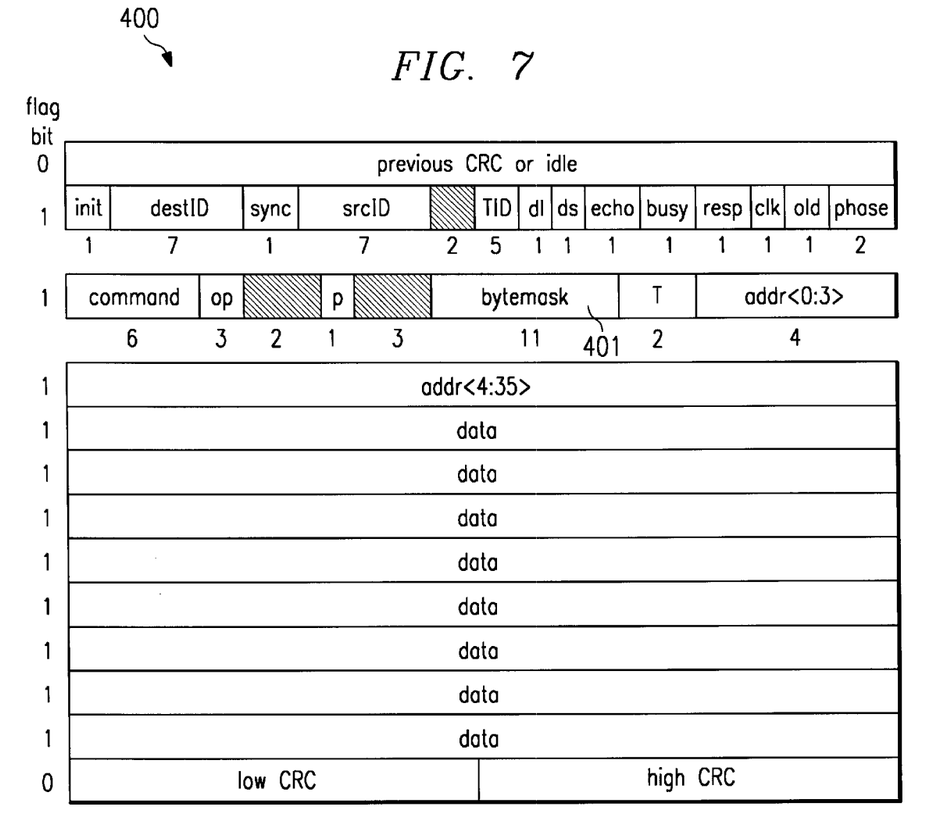
FIG. 7 depicts the send request data packet for carrying the write purge command in the bytemask.

FIG. 7 depicts the symbols in a send request packet 400 on the SCI rings. The significant field in this particular packet is the second symbol in which we have a field labeled bytemask 401. The bytemask field 401 is used to carry the byte mask information for the write_purge_partial.

Figure 8:
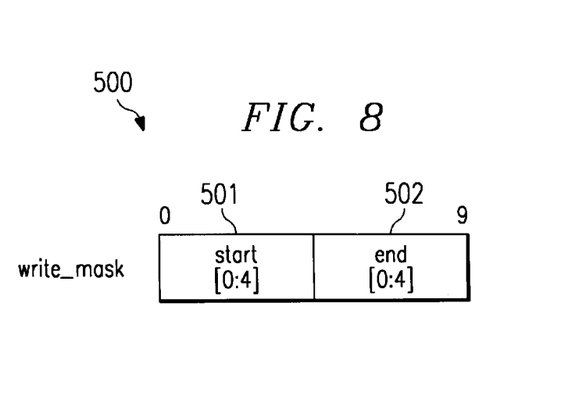
FIG. 8 shows the write mask.

FIG. 8 describes the mask 500 in more detail. The mask consists of a start 501 and an end 502, each being 5 bits. If the start is all 0's and the end is all 1's that means we had started at 0 and ended at 31, meaning we write the whole line per write_purge. Other values may be used, for example, start at 5 and end at 20, however the sub-field must always be of continuous bytes.

Although the present invention and its advantages have been described in detail, it should be understood that various changes, substitutions and alterations can be made herein without departing from the spirit and scope of the invention as defined by the appended claims.

What is claimed is:

1. A method for performing a DMA write operation on a memory with a sharing list in a multi-node system, the method comprising the steps of:

issuing a DMA write linking command that attaches a new node to the sharing list, wherein said sharing list is a list of nodes which have a common memory line copied into cache memory within each of the nodes; and maintaining a connection between the memory and the sharing list while the new node is attaching to the sharing list, wherein said step of maintaining a connection is enabled by said DMA write linking command.

2. The method according to claim 1, wherein:

the linking command is issued by the new node.

3. The method according to claim 1, wherein:

the sharing list, the new node, and the memory are connected by a plurality of pointers.

4. The method according to claim 1, wherein:

the new node is connected between the memory and the shared list.

5. The method according to claim 1, wherein:

the connection is between the new node and the memory.

6. The method according to claim 1, further comprising the steps of:

issuing a purging command to each node in the sharing list; and issuing a collapsing command to separate the sharing list from the memory after the purging command has been issued to each node.

7. The method according to claim 6, wherein:

the purge command invalidates the data stored at each node.

8. The method according to claim 6, wherein:

the purge command is issued by the new node.

9. The method according to claim 6, wherein:

the step of issuing the collapsing command also separates each node in the sharing list from each other.

10. The method according to claim 6, wherein:

the step of issuing the collapsing command also separates the new node from the memory.

11. The method according to claim 6, wherein:

the collapsing command is issued by the new node.

12. The method according to claim 1, further comprising the step of:

using a data packet to distribute the command for the write operation throughout the system.

13. The method according to claim 1, further comprising the step of:

using a write mask as the write command for the write operation.

14. The method according to claim 1, wherein:

the system is a SCI system with cache coherent non-uniform memory access.

15. A method for performing a write purge partial operation on a memory with a sequential sharing list in a SCI based multi-node system cache coherent non-uniform access, the method comprising the steps of:

issuing a memory_write_purge_attach_to_list command that attaches a new node to the sharing list, wherein said sharing list is a list of nodes which have a common memory line copied into cache memory within each of the nodes; and maintaining a connection between the memory and the sharing list while the new node is attaching to the sharing list.

16. The method according to claim 15, wherein:

the memory is marked fresh prior to the step of issuing a memory_write_purge_attach_to_list command.

17. The method according to claim 15, wherein:

the sharing list comprises a plurality of nodes, with a first node of the list marked head_fresh, and with a last node of the list marked tail_valid.

18. The method according to claim 17, wherein:

the remaining nodes of the list are marked mid_valid.

19. The method according to claim 15, further comprising the steps of:

issuing a cpurge_fresh_to_invalid command from the new node to a first node of the list;

issuing a cpurge_valid_to_invalid command from the new node to the next node of the list;

repeating the cpurge_valid_to_invalid command until the node in the list has received the command; and issuing a memory update_list-to-home command after the step of repeating has been completed.

20. The method according to claim 19, wherein:

the memory is marked home subsequent to the step of issuing a memory update_list-to-home command.

21. The method according to claim 15, further comprising the step of:

using a send request packet to distribute the command for the write operation throughout the system.

22. The method according to claim 15, further comprising the step of:

using a write mask as the write command for the write operation.

23. A multi-node system that uses a DMA write operation on a memory with a sharing list, the system comprising:

a DMA write linking command for attaching a new node to the sharing list, wherein said sharing list is a list of nodes which have a common memory line copied into cache memory within each of the nodes; and means for maintaining a connection between the memory and the sharing list while the new node is attaching to the sharing list, wherein the means for maintaining a connection is enabled by said DMA write linking command.

24. The system according to claim 23, wherein:

the sharing list, the new node, and the memory are connected by a plurality of pointers; and the connection is between the new node and the memory.

25. The system according to claim 23, further comprising:

means for purging each node in the sharing list; and means for separating the sharing list from the memory after each node has been purged.

26. The system according to claim 25, wherein:

the means for purging invalidates the data stored at each node.

27. The system according to claim 25, further comprising:

means for separating each node in the sharing list from each other.

28. The system according to claim 23, wherein:

the system is a SCI system with cache coherent non-uniform memory access.

29. A method for performing a DMA write operation on a memory with a sharing list in a multi-node system, the method comprising the steps of:

issuing a DMA write linking command that attached a new node of the sharing list, wherein said sharing list is a list of nodes which have a common memory line copied into cache memory within each of the nodes and wherein said new node includes said common memory line;

maintaining a connection between the memory and the sharing list while the new node is attaching to the sharing list, wherein said step of maintaining a connection is enabled by said DMA write linking command; and masking a portion of data in said common memory line in said new node to enable merging of new data into said memory line.

30. The method of claim 29 further comprising the steps of:

issuing a purging command to each node in the sharing list; and issuing a collapsing command to separate the sharing list from the memory after the purging command has been issued to each node.

31. The method of claim 30 wherein the step of issuing the collapsing command comprises the step of:

separating said nodes in said sharing list from each other.

32. The method of claim 30 wherein the step of issuing the collapsing command comprises the step of:

separating said new node from said memory.

33. The method of claim 29 wherein the multi-node system is a SCI (scale coherent interface) system with cache coherent non-uniform memory access.

* * * * *